United States Patent [19]
Price

[11] 3,797,625
[45]* Mar. 19, 1974

[54] SILO CHUTE WITH SEPARATE DISCHARGE TUBE

[75] Inventor: Raymond R. Price, Rochester, Minn.

[73] Assignee: Rochester Silo, Inc., Rochester, Minn.

[*] Notice: The portion of the term of this patent subsequent to Jan. 9, 1990, has been disclaimed.

[22] Filed: July 27, 1972

[21] Appl. No.: 275,759

Related U.S. Application Data

[63] Continuation-in-part of Ser. No. 166,679, July 28, 1971, Pat. No. 3,709,345.

[52] U.S. Cl................. 193/34, 52/195, 52/196, 214/17 DB
[51] Int. Cl......................... B65g 11/02, B65g 65/36
[58] Field of Search.............. 193/4, 29, 33, 34, 5; 214/17 DB; 52/195, 196; 285/197, DIG. 22

[56] References Cited
UNITED STATES PATENTS
| | | | |
|---|---|---|---|
| 3,709,345 | 1/1973 | Price | 193/34 |
| 480,573 | 8/1893 | Flagg | 138/111 X |
| 3,110,754 | 11/1963 | Witort et al. | 138/114 X |
| 1,436,452 | 11/1922 | Leonard | 193/34 |
| 1,908,821 | 5/1933 | Cornell | 285/197 |
| 163,241 | 5/1875 | Palmieri | 138/114 |

FOREIGN PATENTS OR APPLICATIONS
| | | | |
|---|---|---|---|
| 776,923 | 8/1934 | France | 193/34 |
| 852,326 | 10/1960 | Great Britain | 285/197 |

*Primary Examiner*—Evon C. Blunk
*Assistant Examiner*—W. Scott Carson
*Attorney, Agent, or Firm*—Williamson, Bains & Moore

[57] ABSTRACT

A clean access and service passage is provided within a silo chute by mounting an elongated discharge tube having a plurality of vertically spaced openings therein in an upright manner within the silo chute and utilizing this discharge tube to convey ensilage outwardly from the interior of the silo. For this purpose, a vertically adjustable transfer conduit is selectively positioned to extend between one of the access door openings in the silo wall and one of the discharge tube openings.

9 Claims, 6 Drawing Figures

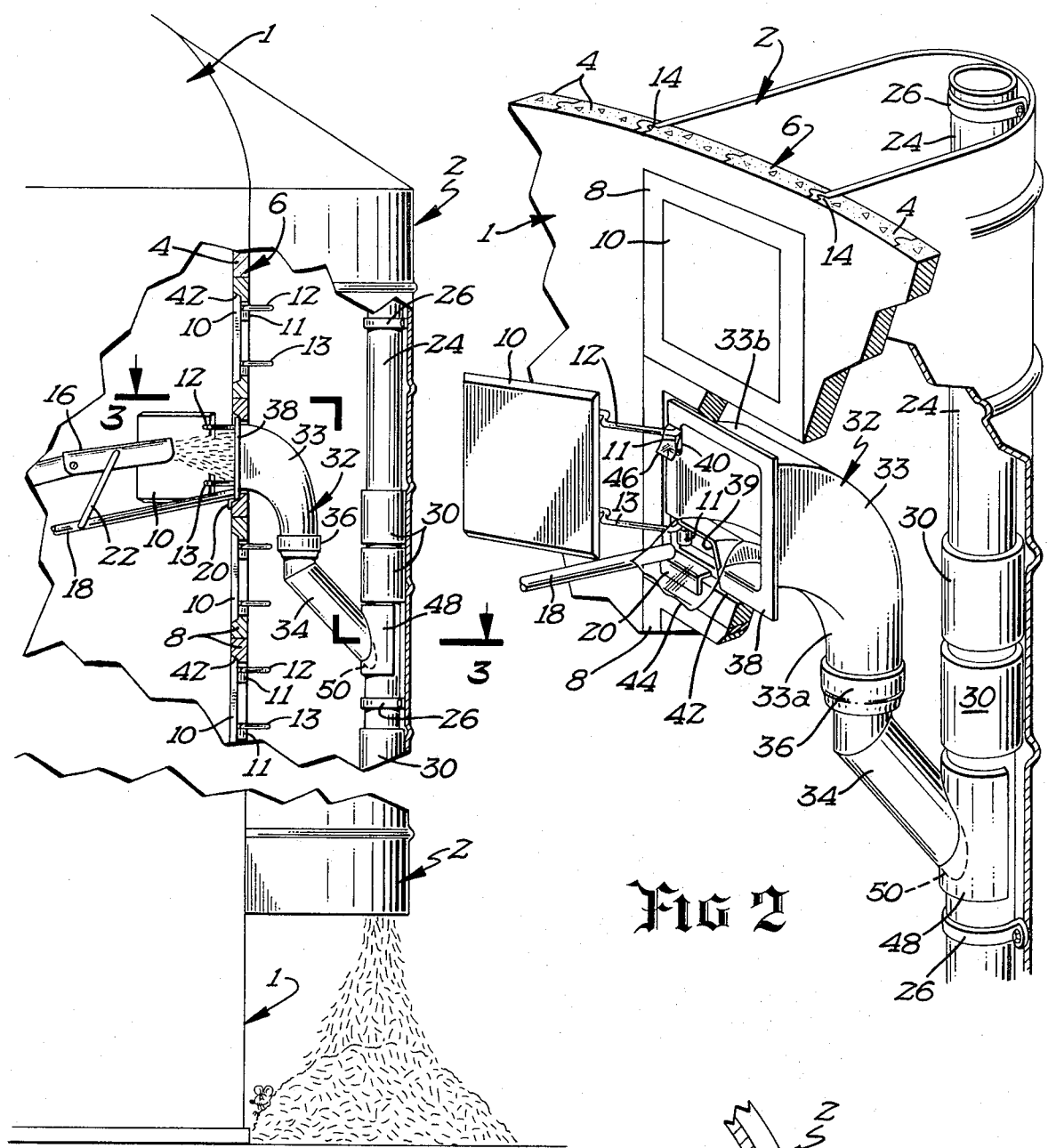
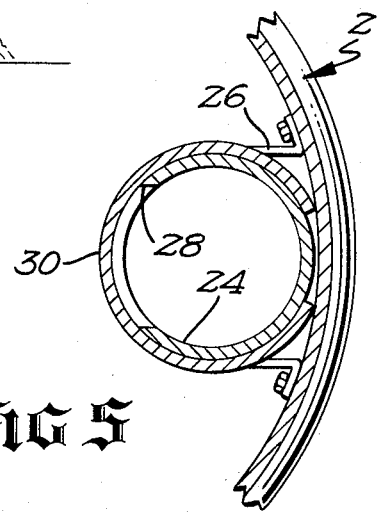

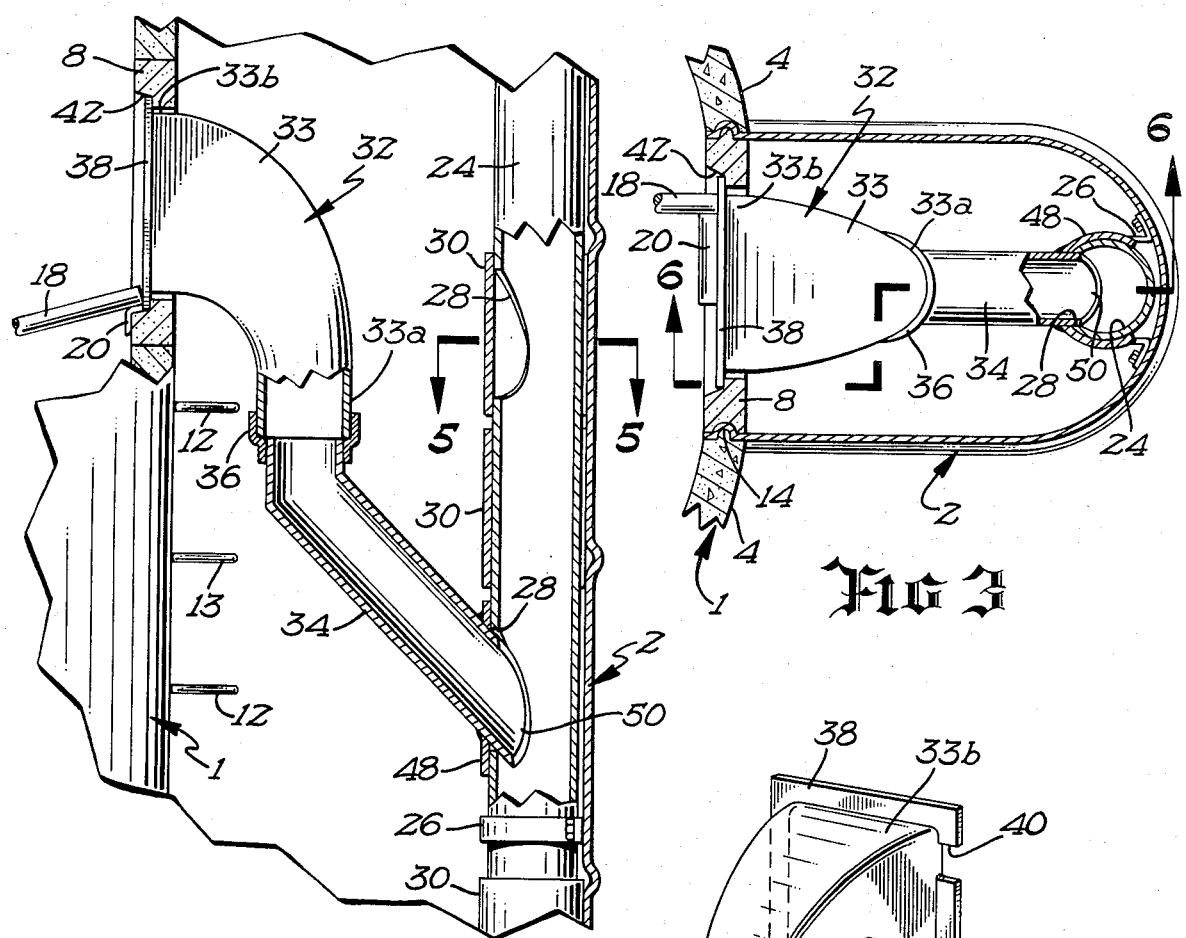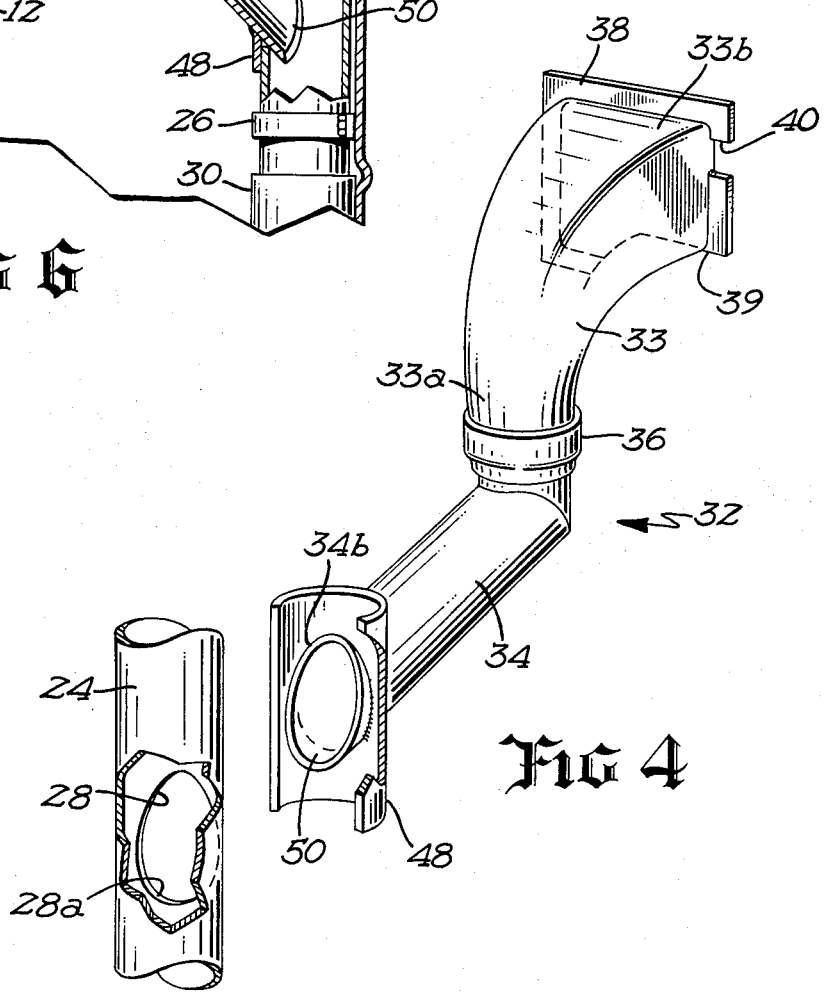

SILO CHUTE WITH SEPARATE DISCHARGE TUBE

BRIEF SUMMARY OF THE INVENTION

This application is a continuation-in-part of my co-pending application entitled Double Passage Silo Chute, which was filed on July 28, 1971, under Ser. No. 166,679, now issued as U.S. Pat. No. 3,709,345 and incorporated herein by reference.

Like the aforesaid copending application, this application is directed to a means of providing a separate ensilage discharge passage within a silo chute so as to be able to maintain a clean access and service passage within the chute wherein there will be no accumulation of ensilage.

The present invention accomplishes this basic objective by the utilization of an elongated discharge tube mounted within a silo chute in spaced apart relation to a plurality of vertically spaced access door openings in one wall of a silo on which the chute is mounted, the discharge tube being relatively rigid and self-supporting and having a plurality of vertically spaced discharge openings therein through which ensilage may be directed from the silo into the discharge tube at selected elevations corresponding to the level of ensilage in the silo. Each of the discharge openings in the discharge tube is normally closed by a closure member which may be moved to an open position for the purpose of placing a particular discharge passage in flow communication with the interior of the silo. For this purpose, transfer conduit means, preferably in the form of a tubular conduit, is adjustably positioned at a desired operational level within the upright chute between one of the access door openings in the silo wall and one of the discharge openings in the discharge tube, the transfer conduit having a receiving end in flow communication with the interior of the silo.

As a particularly advantageous feature of the material handles apparatus of this invention, the aforesaid transfer conduit preferably has a relatively large receiving and collecting end which is removably fitted snugly against one of the silo door openings in sealing contact therewith and a discharge end of reduced cross sectional area which is connected to one of the discharge openings in the discharge tube. The large receiving end of the transfer conduit acts as a collector and deflection device for receiving ensilage blown from the interior of the silo by a conventional unloader and channeling the flow of ensilage into the smaller, discharge end of the transfer conduit. The sealing engagement of the receiving end of the transfer conduit with the access door openings in the silo wall prevents the leakage of ensilage into the access and service passage portion of the silo chute, which it is desired to maintain a clean condition.

A further beneficial aspect of the material handling apparatus of this invention resides in the use of slidably shiftable sleeves on the discharge tube as closure members for the openings in the discharge tube. When it is desired to connect the transfer conduit from the silo with a particular discharge opening in the discharge tube, the sleeve covering that particular opening is slidably shifted to an open position and the transfer conduit is removably attached to the discharge tube by means of an upright coupling sleeve mounted on the outer end of the discharge end of the transfer conduit. This coupling sleeve is preferably an arcuate member open on one side and sufficiently flexible to permit it to be snapped into place around the discharge tube in conforming relation thereto over one of the discharge openings. As the level of ensilage within the silo drops, the transfer conduit is adjusted to successively lower positions within the silo chute and removably attached between one of the silo access door openings and one of the openings in the discharge tube.

These and other objects and advantages of my silo chute invention will become readily apparent as the following description is read in conjunction with the accompanying drawings wherein like reference numerals have been used to designate like elements throughout the several views.

BRIEF DESCRIPTION OF THE DRAWINGS

FIG. 1 is a side elevation view, partially in section, showing the multiple passage silo chute and discharge tube apparatus of this invention mounted on a silo;

FIG. 2 is a perspective view from the interior of the silo, of the silo chute structure of FIG. 1;

FIG. 3 is a horizontal section view of the silo chute structure of this invention taken along lines 3—3 of FIG. 1;

FIG. 4 is an elevation view of the discharge tube apparatus of this invention, showing the transfer conduit in exploded relation thereto;

FIG. 5 is a horizontal section view of the discharge tube and a portion of the silo chute wall taken along lines 5—5 of FIG. 1; and FIG. 6 is a fragmentary, vertical section view of the silo chute structure of FIG. 1 taken along lines 6—6 of FIG. 3.

DETAILED DESCRIPTION

Referring now to the drawings, I have shown in FIGS. 1, 2 and 3 a silo 1 of standard construction on which the material handling and access chute structure of this invention has been mounted, the silo chute being generally indicated by reference numeral 2. Silo 1 is comprised of a plurality of interlocking staves 4 assembled in a well known manner utilizing tongue and groove joints. Staves 4 may be formed from various materials, including concrete, as illustrated herein. In one upright side wall portion of silo 1, generally indicated by reference numeral 6, there is provided a plurality of vertically spaced door frame openings 8 disposed in vertical alignment with each other. Each of the door openings 8 is normally closed by a door 10 which may be mounted in various ways over the door openings to be removable or shiftable to an open position. In the embodiment of the silo and chute structure disclosed herein, silo doors 10 are shown hingedly mounted for swinging movement on hinges 11 attached to the door frames 8. Doors 10 may be swung inwardly from a closed position, to an open position as is illustrated with respect to one of the doors 10 in FIG. 1. Attached to the front face of each of the doors 10 are a pair of vertically spaced ladder and gripping rungs 12 and 13 which have vertically extending segments utilized as pivot pins received within hinge sleeves 11. The particular structure and hinged mounting arrangement of doors 10 forms no part of this invention, and reference is made to my copending application, Ser. No. 166,679, now issued as U.S. Pat. No. 3,709,345, for a more detailed description of the silo door structure. Rungs 12 and 13 attached to each of the vertically spaced silo doors 10 form together a continuous, vertically extending ladder by means of which a workman may ascend the interior of chute 2 to obtain entry to the interior of silo 1 by swinging one of the doors 10 inwardly.

Silo chute 2 may be attached to an upright side wall 6 of silo 1 in a variety of ways. For purposes of illustrative convenience, I have shown silo chute 2 locked in engagement with upright silo wall 6 by means of vertically extending tongues 14 on the inner, upright edges of chute 2. Silo chute tongues 14 are firmly sandwiched in place between mating tongue and groove joints of adjacent silo sleeve 4 on the opposite sides of door frames 8 in the manner shown in FIG. 2. Ensilage is discharged under pressure from the interior of silo 1 into silo chute 2 by means of a mechanical unloader incorporating a blower, the unloader mechanism being of known construction and operation and having a discharge chute 16 through which ensilage is blown through one of the open service doors 10 in the manner shown in FIG. 1 at a level corresponding to the level of ensilage in the silo. Chute 16 may be supported in various manners at the desired vertical location opposite one of the opened service doors 10. One method of doing so is to utilize a so-called torque support arm 18 which rests on the bottom of one of the door frames 8. For this purpose, torque arms 18 is preferably provided with an angle iron bracket 20 attached to its outer end which rests on the bottom of one of the door frames in the manner most clearly illustrated in FIGS. 2 and 6. Torque arm 18 is attached to discharge chute 16 by means of an upwardly extending rod 22 and serves to support and fixedly position discharge chute 16 at the desired vertical level directly opposite one of the door frame openings 8.

As is clearly indicated in FIGS. 2 and 3, silo chute 2 is formed from a generally U-shaped housing member extending vertically along silo 1 and abutting against wall portion 6 thereof in overlying relation to access and service doors 10. In order to provide and maintain a clean access passage within silo chute 2, I have separated the interior of chute 2 into two separate compartments for passages by mounting an upright discharge tube 24 within chute 2 in spaced apart relation to silo side wall 6 and doors 10. In the embodiment of the double passage chute structure disclosed herein, discharge tube 24 is shown mounted at the outer end of chute 2 at the most remote possible location from access doors 10. Discharge tube 24 is preferably attached to the outer wall of silo chute 2 in the upright position shown by a plurality of vertically spaced mounting brackets 26 which fit around tube 2 and are secured to chute 2 by means of fasteners. Alternatively, fasteners could be utilized to directly attach tube 24 to one wall of chute 2. Formed in tube 24 at vertically spaced locations thereon are a plurality of discharge openings 28, tube 24 being oriented so that openings 28 face directly towards side wall portion 6 of silo 1 within which service doors 10 are located. The location and shape of discharge openings 28 in tube 24 are best illustrated in FIGS. 4 and 6. Each of the discharge openings 28 is normally closed by a closure member 30 movable to an open position with respect thereto. For this purpose, I have found it effective and convenient to utilize a plurality of slidably adjustable sleeves 30 which embrace discharge tube 24 and are vertically slidable thereon. As is most clearly shown in FIG. 5, closure sleeves 30, like discharge tube 24, are of circular shape, but are open on one side thereof and are sufficiently flexible to permit there snap mounting on and removal from tube 24.

For the purpose of placing discharge tube 24 in flow communication with the interior of silo 1, at a level corresponding to the level of discharge chute 16, I utilize a transfer conduit generally indicated by reference numeral 32. Conduit 32 has a relatively large collecting and receiving end 33 which is sized to fit within one of the door frame openings 8. Receiving end 33 of conduit 32 tapers inwardly in a funnel-like configuration towards an outlet end 32a (FIG. 6) which is coupled to a discharge end 34 by means of a collar coupling 36. Alternatively, it is contemplated that transfer conduit 32 may be formed as a one piece unit having a receiving end and a discharge end. Discharge end 34 is of reduced cross-sectional area in comparison with the mouth or inlet 33b of receiving end 33. Extending around the periphery of mouth 33b of receiving end 33 of transfer conduit 32 is a flange 38 sized to fit snugly within recesses 42 of door frames 8. Transfer conduit 32 is removably installed from inside silo 1 by extending its discharge end 34 outwardly through one of the door frame openings 8 into silo chute 2. Flange 38 on transfer conduit 32 is moved into tight, abutting engagement with the inside face of one of the door frames 8 in sealing contact therewith to preclude the leakage of any grain or forage downwardly within chute 2 in the access passage portion thereof outside of discharge tube 24. To permit the secure engagement of angle iron bracket 20 on the outer end of unloader support arm 18 with the bottom sill or shoulder of one of the recessed door frames 8, flange 38 is provided with a notch 39 at one, bottom corner thereof, this notched opening being normally covered by a flexible skirt 44 made of plastic or other suitable material which hangs downwardly over notched opening or recess 39 in the manner shown most clearly in FIG. 2. A second notch 40 is formed in one side edge of flange 38 above notch 39 at the location of one of the upper door hinges 11. Lower notch 39 accommodates the lower door hinge 11, and these two notches 39, 40 permit the inward, swinging movement of combined rungs and hinge arms 12, 13 affixed to each one of the doors 10. A second flexible skirt 46 covers notch 40, skirts 44 and 46 serving to prevent the leakage of ensilage through notches 39 and 40 outside of transfer conduit 32 and into the access passage portion of silo chute 2.

Discharge end 34 of transfer conduit 32 terminates at an upright coupling sleeve 48 which is utilized to positively connect transfer conduit 32 to one of the discharge openings 28 in discharge tube 24. Coupling sleeve 48 is removably fitted in place around the outside of discharge tube 24 in conforming relation thereto over one of the discharge openings 28 in the mamner illustrated in FIGS. 2, 4 and 6. For this purpose, coupling sleeve 48 is preferably of arcuate shape, is open on one side thereof, and is sufficiently flexible to permit it to be removably snapped in place around discharge tube 24. A discharge tube 32 and coupling sleeve 48 molded from polyvinylchloride has proven to be sufficiently flexible for this purpose. The bottom wall of discharge end 34 of transfer conduit 32 is provided with an extension in the form of a lip 50 which, as is most clearly shown in FIG. 4, extends within coupling sleeve 48. When sleeve 48 is snapped in place around discharge tube 24 in tight, abutting relation therewith, over one of the discharge openings 28, lip 50 will project into discharge tube 24 through one of its openings 28. Sleeve 48 is vertically adjusted on tube 24 so that lip 50 abuts against the bottom edge 28a of one of the discharge openings 28, whereby lip 50 serves as a flow guide device to conduct ensilage into tube 24 without leakage down the outside thereof. Lip 50 also functions as a vertical stop device for the mounting of coupling sleeve 48 on discharge tube 24 properly positioned so that the outlet 34b of discharge end of transfer conduit 32 is line up directly over one of the discharge tube openings 28.

In utilizing the material handling apparatus comprised of discharge tube 24 and transfer conduit 32 shown in FIG. 4, discharge tube 24 is first mounted within silo chute 2 in the upright position shown in FIGS. 1, 2 and 6. As noted above, discharge tube 24 is preferably mounted within silo chute 2 remote from silo side wall portion 6, adjacent the curved outer end of chute 2. This arrangement insures that an access passage will be provided immediately adjacent silo wall portion 6 and service doors 10, silo chute 2 and discharge tube 24 being sized so that this access passage will be large enough to accommodate workman. With service doors 10 and ladder rungs 12 and 13 located within the confines of the access passage, a workman may climb up within the access passage using the vertically spaced ladder rungs 12 and 13 mounted on doors 10. Access is obtained to the interior of silo 1 by swinging one of the doors 10 inwardly. Then, transfer conduit 32 is mounted within one of the door frame openings 8 at the level at which discharge chute 16 is operating by inserting conduit 32 within the appropriate door frame 8 from inside of the silo. With discharge end 34 of transfer conduit 32 extending outwardly through a door frame opening into silo chute 2, receiving end 33 of conduit 32 is snugly mounted within the door frame opening by abutting flange 38 tightly against the inside face of recess 42 of one of the door frame opening. Receiving end 33 of transfer conduit 32, being substantially as large as one of the door frame openings 8, acts as a collecting device to receive grain or forage being blown outwardly through discharge tube 6 in the manner illustrated in FIG. 1, and then funnels this material outwardly and downwardly through reduced diameter discharge end 34 of conduit 32. Before this discharge operation is commenced, however, one of the slide sleeves 30 is slid upwardly on discharge tube 24 to expose one of the discharge openings 28 at the proper level for connection to discharge end 34 of transfer conduit 32. Sleeve coupling 48 is then snapped in place over the exposed discharge opening 28 with lip 50 extending over and resting against the lower edge 28a of the particular discharge opening. In FIGS. 1 and 6, I have shown one of the sleeve closure members 30a slid upwardly on discharge tube 24 to uncover a discharge opening 28 over which coupling sleeve 48 has been snapped in place. After this operation has been completed, ensilage is blown from the interior of silo 1 through discharge chute 16 into transfer conduit 32 and thence downwardly through discharge tube 24 to be conveyed from the bottom end of silo chute 2. As the level of ensilage drops within silo 1, discharge chute 16 is lowered and transfer conduit 32 is removably adjusted to successively lower door frame openings 8 in order to be in position opposite discharge chute 16 at each operating level thereof. Each time that transfer conduit 32 is vertically adjusted to a different door frame opening, coupling sleeve 48 thereon is snapped in place over a lower discharge opening 28, after its cover sleeve 30 has been slid upwardly to an open position.

It will be appreciated, that by the operation and use of discharge tube 24 and transfer conduit 32 within a silo chute in the aforesaid manner, ensilage from the interior of the silo will be confined entirely within discharge tube 24, and a clean access passage will be maintained within silo chute 2 adjacent to access doors 10 and ladder rungs 12, 13. Thus, there will be no accumulation of sticky, gummy ensilage within the access passage and on ladder rungs 12, 13.

Although discharge tube 24 has been shown mounted directly opposite access doors 10 on the curved, outer portion of silo chute 2, it is contemplated that discharge tube 24 could be mounted on one of the side walls of chute 2, and still maintain a sufficiently large access passage within chute 2. If discharge tube 24 were mounted in such a manner, the configuration of transfer conduit 32 would of course have to be changed so that its discharge end 34 would be directed towards the side mounted discharge tube 24. I anticipate that various other changes may be made in the size, shape, configuration and installation of discharge tube 24 and transfer conduit 32 without departing from the spirit and scope of my invention as defined by the following claims.

I claim:

1. In combination with a silo, an improved, double passage chute structure comprising:
   a vertically extending silo of tubular configuration defined by upright side walls;
   a plurality of vertically spaced door openings in one side wall portion of said silo, said door openings being in substantially vertical alignment with each other;
   an elongated, generally U-shaped housing member extending vertically along said one side wall portion of said silo in abutting relation therewith, said U-shaped member being disposed in overlying relation to said door openings and cooperating with said side wall portion of said silo to define an upright chute;
   an elongated, self-supporting discharge tube extending vertically within said upright chute in spaced apart relation to said one side wall portion of the silo to provide space for an access passage within said chute within which said door openings are located, said discharge tube serving as an ensilage discharge passage;
   a plurality of vertically spaced discharge openings in said discharge tube facing generally towards said one side wall portion of the silo;
   a closure member normally disposed in closing relation to each of said discharge openings and movable to an open position with respect thereto; and
   transfer conduit means extending between one of said silo door openings and one of said discharge openings for conducting ensilage from the interior of said silo into said discharge tube, said transfer conduit means being adjustable to various vertical operational levels within said upright chute in cooperation with a selected one of said silo door openings and having a receiving end in flow communication with the interior of the silo.

2. A silo and chute structure as defined in claim 1 wherein:

said transfer conduit means is in the form of a conduit having a relatively large ensilage receiving and collecting end fitting snugly against one of said door openings in sealing contact therewith and a discharge end of reduced cross sectional area connected to one of said discharge openings in said discharge tube.

3. A silo and chute structure as defined in claim 2 wherein:

a flange extends around the periphery of said receiving end of said transfer conduit means, said flange abutting against the inside face of the frame around one of said silo door openings in sealing contact therewith, whereby said transfer conduit means may be removed from said discharge tube by pulling said conduit means into the silo through one of said door openings.

4. A silo and chute structure as defined in claim 1 wherein:

said transfer conduit means has a discharge end which terminates at an upright coupling sleeve removably fitted in place around the outside of said discharge tube in conforming relation thereto over one of said discharge openings.

5. A silo and chute structure as defined in claim 4 wherein:

said coupling sleeve has a greater length than the height of said discharge openings and extends upwardly and downwardly beyond the top and bottom edges of one of said discharge openings in sealing relation thereover when said sleeve is coupled to said discharge tube.

6. A silo and chute structure as defined in claim 4 wherein:

said closure members over said discharge openings in said discharge tube are in the form of sleeves embracing said discharge tube and vertically shiftable thereon.

7. A silo and chute structure as defined in claim 4 wherein:

said discharge tube and coupling sleeve are of arcuate shape, said sleeve being open on one side thereof and sufficiently flexible to permit it to be removably snapped in place around said discharge tube.

8. A silo and chute structure as defined in claim 4 wherein:

a lip is formed on the bottom of said discharge end of said transfer conduit means within said coupling sleeve, said lip projecting into said discharge tube through one of said discharge openings and abutting against the bottom edge thereof to serve as a flow guide means for ensilage and as a vertical stop device for the mounting of said coupling sleeve of said transfer conduit means on said discharge tube.

9. A silo and chute structure as defined in claim 1 wherein:

said discharge tube is attached to a wall segment of said upright chute at a spaced apart location from said door openings in said side wall portion of the silo.

* * * * *